United States Patent
Yanagisawa (10) Patent No.: US 9,932,450 B2
(45) Date of Patent: Apr. 3, 2018

(54) METHOD OF PRODUCING WET MASTER BATCH, WET MASTER BATCH, RUBBER COMPOSITION, AND SOLID-LIQUID SEPARATING AND DEHYDRATING APPARATUS FOR WET MASTER BATCH PRODUCTION

(71) Applicant: BRIDGESTONE CORPORATION, Tokyo (JP)

(72) Inventor: Yasuto Yanagisawa, Soka (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 180 days.

(21) Appl. No.: 14/525,306

(22) Filed: Oct. 28, 2014

(65) Prior Publication Data

US 2015/0119496 A1   Apr. 30, 2015

(30) Foreign Application Priority Data

Oct. 31, 2013   (JP) ................................. 2013-227453
May 21, 2014   (JP) ................................. 2014-105332

(51) Int. Cl.
| | | |
|---|---|---|
| C08J 3/22 | (2006.01) | |
| B01D 33/35 | (2006.01) | |
| B01D 33/44 | (2006.01) | |
| B01D 33/04 | (2006.01) | |
| B01D 33/64 | (2006.01) | |

(52) U.S. Cl.
CPC ................ *C08J 3/22* (2013.01); *B01D 33/35* (2013.01); *B01D 33/44* (2013.01); *B01D 33/04* (2013.01); *B01D 33/646* (2013.01); *C08J 2307/02* (2013.01)

(58) Field of Classification Search
CPC ................................... B01D 33/35; C08J 3/22
USPC ............... 210/323.1, 324, 326, 332; 523/351
See application file for complete search history.

(56) References Cited

U.S. PATENT DOCUMENTS

| | | | |
|---|---|---|---|
| 2002/0026004 A1 | 2/2002 | Goerl et al. | |
| 2012/0053264 A1* | 3/2012 | Nakayama | ............... B60C 1/00 523/340 |

FOREIGN PATENT DOCUMENTS

| | | |
|---|---|---|
| JP | 59500092 A | 1/1984 |
| JP | 7509 U | 1/1995 |
| JP | 975638 A | 3/1997 |
| JP | 2005199145 A | 7/2005 |
| JP | 4505038 B1 | 7/2010 |
| JP | 2012136574 A | 7/2012 |
| JP | 2013163718 A | 8/2013 |
| JP | 5676588 B2 | 2/2015 |
| WO | 2011145586 A1 | 11/2011 |

* cited by examiner

*Primary Examiner* — Edward J Cain
(74) *Attorney, Agent, or Firm* — Sughrue Mion, PLLC (57) ABSTRACT

Provided is a method of producing a wet master batch, including the step of: solid-liquid separating and dehydrating a coagulum slurry obtained by mixing a rubber latex with a carbon black slurry containing a carbon black dispersed in water and coagulating the mixture, the solid-liquid separating and dehydrating step including gravity filtering and vacuum filtering the coagulum slurry on a filtration filter and then pressurizing, by means of a pressurizer, the coagulum slurry on the outer peripheral surface of a drum, to thereby pressure dehydrate the coagulum slurry. Also provided is a solid-liquid separating and dehydrating apparatus for wet master batch production, which includes: a filtration filter; a filtration portion; a drum; and a pressurizer.

10 Claims, 2 Drawing Sheets

METHOD OF PRODUCING WET MASTER BATCH, WET MASTER BATCH, RUBBER COMPOSITION, AND SOLID-LIQUID SEPARATING AND DEHYDRATING APPARATUS FOR WET MASTER BATCH PRODUCTION

TECHNICAL FIELD

The present invention relates to a method of producing a wet master batch, a wet master batch, a rubber composition, and a solid-liquid separating and dehydrating apparatus for wet master batch production.

BACKGROUND ART

Wet master batches have been produced for the purpose of improving a rubber composition containing a filler such as a carbon black in terms of workability and dispersibility of the filler in the rubber composition. The wet master batches are generally produced through a method including: a given rubber latex solution preparation step of compounding and preparing a rubber latex solution by optionally adding a surfactant and water to a latex of natural rubber or synthetic rubber; a filler slurry preparation step of compounding and preparing a slurry solution containing a filler such as a carbon black dispersed in a solvent such as water; a mixing and coagulating step of continuously mixing and coagulating the rubber latex solution and the filler slurry prepared in the steps above so as to form a coagulation solution containing a coagulum; a solid-liquid separating step of separating and taking out only the coagulum from the coagulation solution thus formed; a cleaning step of cleaning the coagulum thus separated, so as to remove impurities such as solidifier attached or contained in the coagulum; a dehydrating step of removing water filled in the inner gaps of the cleaned coagulum; a drying step of drying the coagulum thus dehydrated; and an optional molding step of molding the dried coagulum into a desired shape such as in the form of granules or in the form of a sheet, to thereby form a wet master batch as a product.

CITATION LIST

Patent Literature

PTL 1: JP 4505038 B

SUMMARY OF INVENTION

Technical Problem

A coagulum to be obtained after the mixing and coagulating step may be reduced or even be made uniform in particle size in order to gain various advantages as follows. That is, the off-standard disposal rate in proceeding to the solid-liquid separating step and to the dehydrating step can be significantly reduced so that the yield can be greatly improved, the dehydration efficiency can be increased, and the like. However, when a coagulum has a particle size of equal to or less than several hundred which is smaller than a general particle size (of 1 to several ten centimeters), a coagulation solution containing the coagulum is in a slurry form. The solid-liquid separation and dehydration of the coagulum slurry was tried using a solid-liquid separator and a dehydrator used in a conventional method of producing a wet master batch, but failed.

For example, the aforementioned coagulum slurry was subjected to solid-liquid separation and dehydration through centrifugal separation that has been performed in a conventional wet master batch production method, or to solid-liquid separation/dehydration while heating and pressurizing the slurry, using a screw press machine provide with a heating type screw shaft as described in Patent Literature 1 (PTL 1), but water was failed to be separated from the coagulum slurry.

Further, when the aforementioned coagulum slurry was subjected to solid-liquid separation/dehydration through spontaneous sedimentation on a filter cloth, it was just enough to barely separate water from the coagulum slurry, and the solid obtained after the dehydration became unstable in quality, in particular, in moisture content, which even required an additional step of taking out a solid in a massive form from the filter cloth and crashing the solid before sending it to the drying step, which simultaneously led to a problem of low production capacity and high cost.

In light of the above, the present invention has an object of providing a method of producing a wet master batch and a solid-liquid separating and dehydrating apparatus for wet master batch production, which are capable of efficiently solid-liquid separating and dehydrating a coagulum slurry containing a coagulum that is small in particle size. Further, the present invention has another object of providing a wet master batch produced by the aforementioned efficient method of producing a wet master batch, and a rubber composition.

Solution to Problem

A method of producing a wet master batch according to the present invention includes the step of: solid-liquid separating and dehydrating a coagulum slurry obtained by mixing a rubber latex with a carbon black slurry containing a carbon black dispersed in water and coagulating the mixture, in which the solid-liquid separating and dehydrating step comprises gravity filtering and vacuum filtering the coagulum slurry on a filtration filter and then pressurizing, by means of a pressurizer, the coagulum slurry on the outer peripheral surface of a drum, to thereby pressure dehydrate the coagulum slurry. The coagulum slurry may be gravity filtered and vacuum filtered and then pressure dehydrated on a filtration filter as described above, so that a coagulum slurry containing a coagulum small in particle size can efficiently be solid-liquid separated and dehydrated.

In the method of producing a wet master batch according to the present invention, the solid-liquid separating and dehydrating step may preferably be carried out on a single filtration filter, and the filtration filter may preferably be a belt-like filter cloth that runs in a circulated manner. The solid-liquid separating step and the dehydrating step may be carried out on the single filtration filter so that these steps, which have been conventionally performed in two stages using separate apparatuses, can performed as a continuous series of step using a single apparatus. Further, the filtration filter is configured to be a belt-like filter cloth that runs in a circulated manner so as to downsize an apparatus for use in the solid-liquid separating and dehydrating step.

In the method of producing a wet master batch according to the present invention, a solid obtained through the solid-liquid separating and dehydrating step may preferably have a moisture content of 40 mass % to 65 mass %. With the moisture content of the solid falling within the aforementioned range, the solid can be handled with ease in the subsequent drying step, while suppressing energy consumption as well.

In the method of producing a wet master batch according to the present invention, a solid obtained through the solid-liquid separating and dehydrating step may preferably be in a sheet shape or in a strip shape each having a thickness of 0.5 mm to 3.0 mm. The solid being in such shape can be handled with ease in the subsequent drying step.

In the method of producing a wet master batch according to the present invention, the filtration filter may preferably have an air permeability of 10 cm$^3$/(cm$^2$·sec) to 200 cm$^3$/(cm$^2$·sec). With the air permeability of the filtration filter falling within the aforementioned range, the amount of loss of a coagulum through the filtration filter may be suppressed without deteriorating the efficiency in vacuum filtration.

In the method of producing a wet master batch according to the present invention, the filtration filter may preferably be made of a material being polypropylene or polyethylene terephthalate. The filtration filter made of such materials has resistance to acid, which can prevent degradation of the filtration filter that is otherwise caused by acid in the coagulum slurry.

In the method of producing a wet master batch according to the present invention, the filtration filter may preferably be woven in a twill weave or satin weave. The filtration filter woven in the aforementioned patterns is excellent in filtration capacity, cake peeling property, clogging resistance, and ability of collecting a coagulum slurry.

In the method of producing a wet master batch according the present invention, the filtration filter may preferably be woven by yarn in the form of monofilament or multifilament. The filtration filter with the yarn being in the form of monofilament, the filtration filter is excellent in filtration capacity, cake peeling property, and clogging resistance, while with the yarn being in the form of multifilament, the filtration filter is excellent in ability of collecting a coagulum slurry.

In the method of producing a wet master batch according to the present invention, the filtration filter may preferably have a thickness of 0.4 mm to 0.8 mm. The filtration filter having the aforementioned thickness is capable of increasing efficiency of the vacuum filtration, which leads to sufficient solid-liquid separation/dehydration.

In the method of producing a wet master batch according to the present invention, the filtration filter may preferably run at a running speed of 0.5 m/min to 3.0 m/min. With this configuration, the solid to be obtained as a result of the solid-liquid separating and dehydrating step can have a moisture content adjusted to be in a desired range.

A wet master batch of the present invention is produced by the aforementioned method of producing a wet master batch. The wet master batch can be obtained by efficiently solid-liquid separating and dehydrating a coagulum slurry containing a coagulum that is small in particle size, and the wet master batch is excellent wear resistance and fatigue resistance. Further, a rubber composition of the present invention includes the wet master batch described above. The rubber composition is also excellent in wear resistance and fatigue resistance.

Further, a solid-liquid separating and dehydrating apparatus for wet master batch production of the present invention, includes: a filtration filter; a filtration portion for gravity filtering and vacuum filtering a coagulum slurry obtained by mixing a rubber latex with a carbon black slurry containing a carbon black dispersed in water and coagulating the mixture; a drum; a pressurizer for pressurizing the filtered coagulum slurry on the outer peripheral surface of the drum to pressure dehydrate the coagulum slurry. With the use of the solid-liquid separating and dehydrating apparatus, the solid-liquid separation and the dehydration of a coagulum slurry containing a coagulum that is small in particle size can be efficiently performed.

The solid-liquid separating and dehydrating apparatus for wet master batch production according to the present invention may preferably further include a cleaning device for the filtration filter. This configuration allows for the long-term repeated use of the filtration filter.

In the solid-liquid separating and dehydrating apparatus for wet master batch production according to the present invention, the filtration filter may preferably be a belt-like filter cloth and run in a circulated manner as passing the filtration portion and the pressurizer. This configuration allows for downsizing of the solid-liquid' separating and dehydrating apparatus.

Advantageous Effect of Invention

According to the present invention, there can be provided a method of producing a wet master batch and, a solid-liquid separating and dehydrating apparatus for wet master batch production, that are capable of efficiently subjecting a coagulum slurry containing a coagulum to solid-liquid separation and dehydration, the coagulum being small in particle size. Further, according to the present invention, there can be provided a wet master batch produced by this efficient method of producing a wet master batch, and a rubber composition.

BRIEF DESCRIPTION OF DRAWINGS

The present invention will be further described below with reference to the accompanying drawings, wherein.

DESCRIPTION OF EMBODIMENTS

In the following, embodiments of the present invention will be described.

[Rubber Latex]

Examples of the rubber latex that can be used in the present invention may include: a natural rubber latex; a synthetic rubber latex; and the mixture of those, any of which can be used. The natural rubber latex is not particularly limited, and may be selected as appropriate depending on the intended use. Examples thereof may include, for example: a field latex; an ammonia-treated latex; a centrifugal condensed latex; a deproteinized latex treated with a surfactant and/or an enzyme; and a mixture of those. The synthetic rubber latex is not particularly limited, and may be selected as appropriate depending on the intended use. Examples thereof may include, for example: SBR (styrene-butadiene rubber) latex; BR (butadiene rubber) latex; IR (polyisoprene) latex; NBR (nitrile rubber) latex; CR (chloroprene rubber) latex, VP (vinyl pyridine) latex, MBR (butadiene-methyl methacrylate rubber) latex; and a mixture of those. A rubber latex with a high solid concentration may be used after being adjusted to a desired solid concentration by a dispersion medium such as water.

[Carbon Black Slurry]

The carbon black may be of any type that is not particularly limited, and examples thereof may include those generally used in the rubber industry, such as, for example, SAF, ISAF, HAF, FF, FEF, GPF, SRF, and a mixture of those. The carbon black may preferably have, on the surface thereof, a certain amount of an acid functional group such as a carboxyl group. The reason is that, when the carbon black having, on the surface thereof, a certain amount of an acid functional group is dispersed into water under the presence of a base, the acid functional group is ionized to be hydrated, with the result that the carbon black can be finely dispersed in a stable manner in the carbon black slurry. As an example of the carbon black having a certain amount of an acid functional group, there may be used the one having an acid functional group introduced on the carbon black surface through oxidation treatment or the like. The acid functional group may be introduced through any technique that is not particularly limited, and exemplary techniques thereof may include: a liquid phase oxidation treatment; and a vapor phase oxidation treatment, with the vapor-phase ozone treatment being preferred for the following reason. That is, the vapor-phase ozone treatment is lower in cost than the liquid phase oxidation treatment, and capable of effectively introducing a carboxyl group. The vapor phase ozone treatment refers to a process of bringing a carbon black in a dry state into contact with an ozone gas so as to oxidize the carbon black.

The acid functional group amount in the vapor-phase ozone treated carbon black is not particularly limited, but may preferably be 0.2 μeq/m$^2$ to 3.0 μeq/m$^2$. The reason is as follows. That is, if the acid functional group amount is excessively small, it may lead to insufficient hydration on the carbon black surface, whereas if the acid functional group amount is excessively large, it may lead to retardation in vulcanization when the wet master batch to be produced is used to produce a rubber product. The acid functional group amount in the vapor-phase ozone treated carbon black can be determined though neutralization titration using a base. Specifically, 50 mL of 0.976 N sodium hydrogen carbonate added with 2 g to 5 g of the carbon black is subjected to shaking for 6 hours and then the carbon black is filtered from the reactant solution. Thereafter, the filtrate is added with 0.05 N hydrochloric acid aqueous solution and then subjected to neutralization titration using 0.05 N sodium hydroxide aqueous solution, so as to measure the carboxyl group amount. The value obtained by dividing the measured value by the nitrogen absorption specific surface area ($N_2SA$; m$^2$/g) of the carbon black is determined as the carboxyl group amount (μeq/m$^2$) generated per unit surface area of the carbon black. The carboxyl group amount (μeq/m$^2$) per unit surface area thus obtained is determined as the aforementioned acid functional group amount (μeq/m$^2$).

The DBP (dibutyl phthalate) absorption amount of the carbon black is not particularly limited, and may preferably be 50 mL/100 g to 100 mL/100 g, for the following reason. That is, with the DBP absorption amount, which is an indicator of the size of the carbon black structure, being 50 mL/100 g or more, the once-dispersed carbon black is unlikely to reagglomerate, and with the DBP absorption amount being 100 mL/100 g or less, a sufficient reinforcing effect can be obtained in the rubber composition. The CTAB absorption specific surface area of the carbon black is not particularly limited, and may preferably be 100 m$^2$/g to 150 m$^2$/g, for the following reason. That is, with the CTAB absorption specific surface area, which is an indicator of a specific surface area that serves as a contact interface with water, being 100 m$^2$/g or more, it is sufficient for the hydration of the ionized acid functional group on the carbon black surface, and with the CTAB being 150 m$^2$/g or less, there is no risk of deteriorating the dispersiveness of the carbon black into a rubber composition.

The carbon black concentration in the carbon black slurry is not particularly limited, and may preferably be 20 mass % or less for the following reason. That is, with the carbon black concentration being 20 mass % or less, the carbon black can be finely dispersed in water in a more stable manner.

The carbon black slurry may preferably be added with a base for the following reason. That is, the addition of a base allows the acid functional group on the carbon black surface to be ionized, with the result that the carbon black particles can finely be dispersed in water in a stable manner. The base that can be used is not particularly limited, and examples thereof may include: sodium hydroxide; ammonia; and a mixture of those.

The aforementioned carbon black is mixed with water and, optionally, with a base, and the carbon black is dispersed in water, to thereby prepare a carbon black slurry. A dispersant may also be added in order to have the carbon black stably dispersed. However, it is more preferred, for example, to use the vapor phase ozone treated carbon black, so as to eliminate the need for adding a dispersant. Here, the "dispersant" refers to a surfactant and a resin to be added for the purpose of stably dispersing the carbon black in the carbon black slurry, and specific examples thereof may include: an anionic polymer such as polyacrylate salt, salt of styrene-acrylic acid copolymer, salt of vinylnaphthalene-acrylic acid copolymer, salt of styrene-maleic acid copolymer, salt of vinylnaphthalene-maleic acid copolymer, sodium salt of P-naphthalenesulfonic acid formalin condensate, polyphosphate salt, and the like; a nonionic polymer such as a polyvinyl alcohol, polyvinylpyrrolidone, polyethylene glycol, and the like; protein such as gelatin, albumin, casein, and the like; water-soluble natural rubbers such as gum arabic, gum tragacanth, and the like; glucosides such as saponin and the like; cellulose derivatives such as methylcellulose, carboxymethyl cellulose, hydroxy methylcellulose, and the like; and a natural polymer such as lignosulfonate salt, shellac and the like.

The method of dispersing the aforementioned carbon black is not particularly limited, and the carbon black may be dispersed using a known disperser including, for example, a mixer, a homogenizer, a colloid mill, and the like, with being preferred is either one of the method of applying a grinding stress using a medium, a method of applying a shearing force through the rotation of a stirring blade, and a method of colliding pressure-injected carbon black slurries with each other. The reason is that those methods are capable of finely dispersing the carbon black with efficiency.

The dispersion through application of a grinding stress using a medium may be carried out by using, for example, a bead mill so as to wet grind the carbon black in the carbon black slurry. A commercially-available bead mill may be used herein. The use conditions of the bead mill may be set as appropriate by a person skilled in the art depending on the desired degree of dispersion of the carbon black, that is, the particle size distribution and the volume average particle size desired for the carbon black in the carbon black slurry. The number of passes (the number of times the slurry is passed through the mill) is not particularly limited, and may also be set as appropriate, depending on the desired degree of dispersion of the carbon black.

The dispersion through application of a shearing stress by the rotation of a stirring blade may be carried out by using, for example, an in-line mixer to mix the carbon black slurry. A commercially-available in-line mixer may be used herein. The magnitude of the shearing force to be applied by the rotation of the stirring blade is not particularly limited, and may be set as appropriate by a person skilled in the art, depending on the desired degree of dispersion of the carbon black.

The dispersion through colliding pressure-injected carbon black slurries with one another may be carried out by using, for example, Star Burst (registered trademark) provided with a lotus toward collision chamber, available from Sugino Machine Limited, so as to pressure-inject carbon black slurries from a plurality of directions to thereby collide the pressure-injected carbon black slurries with one another. The pressure conditions for use in Star Bust are not particularly limited, and may be set as appropriate by a person skilled in the art depending on the desired degree of dispersion of the carbon black, with 50 MPa to 250 MPa being preferred. The number of passes (the number of times the slurries are collided) is not particularly limited, and may be set as appropriate depending on the degree of dispersion of the carbon black.

The particle size distribution of the carbon black in the carbon black slurry is not particularly limited, and the ratio of particles with a particle size of 1 µm or less may preferably be 15% or more in volume base. The reason is that the particle size of a coagulum in a coagulum slurry to be obtained by mixing the carbon black slurry with a rubber latex and then coagulating the mixture can be reduced to small as well as being made uniform. The aforementioned particle size distribution is measured by a laser diffraction scattering method, and can be measured by using, for example, particle size analyzer Microtrac MT3000 (available from NIKKISO CO., LTD.) and the like.

[Mixing and Coagulating Step]

The coagulum slurry to be subjected to solid-liquid separating and dehydrating step in the present invention can be obtained by mixing a rubber latex with the carbon black slurry of the carbon black dispersed in water and then coagulating the mixture. The compounding ratio between the rubber latex and the carbon black slurry is not particularly limited, and may vary depending on the intended use of the wet master batch to be produced.

The rubber latex and the carbon black slurry are poured into a coagulation bath, and the mixture is applied with a shearing force by a known stirrer such as a stirring blade disposed in the coagulation bath so as to mix and coagulate the mixture, to thereby obtain a coagulum slurry. In the case of using a stirring blade as the stirrer, the shape, the area, and the rotational speed thereof are not particularly limited, and may use those generally used in the mixing and coagulating step. The time necessary for the mixture and coagulation may be determined in line with the time generally spent in the mixing and coagulating step.

According to a conventional method, in the case of mixing and coagulating a rubber latex and the carbon black slurry to obtain a coagulum slurry, a coagulant is generally used in order to complete the coagulation. However, it is preferred not to use a coagulant in the mixing and coagulating step as long as the coagulation can be completed only by stirring, for example, in such a case where the particle size distribution of the carbon black in the carbon black slurry is defined such that the ratio of particles with a particle size of 1 µm or less is set to be 15% or more in volume base. In this specification, the "coagulant" refers to an additive to be added to complete the coagulation, such as, for example, formic acid, acetic acid, sulfuric acid, hydrochloric acid, and other acids; and aluminum sulfate, sodium chloride, calcium chloride, and other salts; and the like.

[Coagulum Slurry]

A rubber latex and the carbon black slurry may be mixed and coagulated, so as to obtain a coagulum slurry containing a coagulum of the carbon black particles and the latex particles. The coagulum slurry to be subjected to the solid-liquid separating and dehydrating step in the present invention may contain a coagulum with a particle size that is preferably smaller than a particle size (exceeding 1 mm) of a conventionally-obtained coagulum. The coagulum may preferably have a particle size at 90 volume % (D90) of 40 µm to 1000 µm. The particle size at 90 volume % (D90) refers to a particle size obtained when the integrated quantity of the particles accounts for 90% on the cumulative particle mass curve in volume base, the curve representing the measurement results obtained by measuring the particle size distribution by a laser diffraction scattering method. The particle size at 90 volume % may be measured by using a particle size analyzer Microtrac MT3000 (available from NIKKISO CO., LTD.). The coagulum concentration in the coagulum slurry obtained as above is not particularly limited, and may preferably be 5 mass % to 20 mass %. The reason is that, the coagulum concentration in the coagulum slurry being 5 mass % to 20 mass % while the particle size at 90 volume % (D90) of the coagulum being 40 µm to 1000 µm makes it easier to handle the slurry in the solid-liquid separating and dehydrating apparatus. In the case where the coagulum concentration is higher than the aforementioned range, water may be added to adjust the coagulum concentration to fall within the aforementioned range.

[Solid-Liquid Separating and Dehydrating Step]

According to the step of solid-liquid separating and dehydrating the coagulum slurry of the present invention, the coagulum slurry is subjected to gravity filtration and vacuum filtration on a filtration filter and thereafter subjected to pressure dehydration in which the slurry is pressurized, by means of a pressurizer, on the outer peripheral surface of a drum. The slurry may be subjected to gravity filtration and vacuum filtration and then subjected to pressure dehydration, to thereby efficiently solid-liquid separating and dehydrating the coagulum slurry containing a coagulum that is small in particle size.

The aforementioned solid-liquid separating and dehydrating step is not particularly limited, and may be performed by using, for example, the solid-liquid separating and dehydrating apparatus for wet master batch production of the present invention. The solid-liquid separating and dehydrating apparatus for wet master batch production of the present invention includes: a filtration filter; a filtration portion for gravity filtrating and vacuum filtrating a coagulum slurry being obtained by mixing a rubber latex with a carbon black slurry containing a carbon black dispersed in water and coagulating the mixture; a drum; and a pressurizer for pressurizing the slurry on the outer peripheral surface of the drum to pressure dehydrate the filtered coagulum slurry. With the use of the solid-liquid separating and dehydrating apparatus, a coagulum slurry containing a coagulum with a small particle size can be efficiently solid-liquid separated and dehydrated. The solid-liquid separating and dehydrating apparatus may preferably include a device for cleaning the filtration filter, so as to allow for the long-term repeated use of the filtration filter.

In the solid-liquid separating and dehydrating apparatus for wet master batch production of the present invention, the filtration filter may preferably be of a belt-like filter cloth which is run in a circulated manner as passing through the filtration portion and the pressurizer. This configuration allows for downsizing of the aforementioned solid-liquid separating and dehydrating apparatus.

Figure 1:
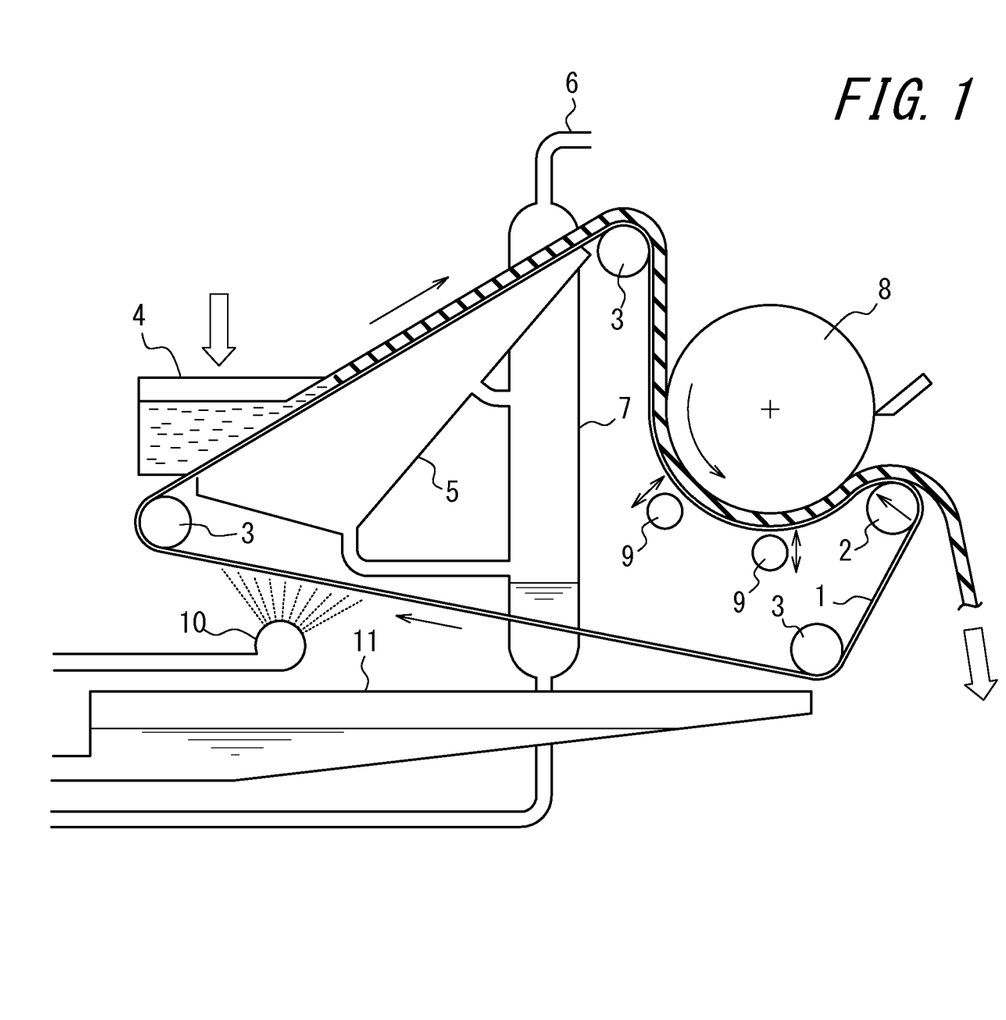
FIG. 1 is a schematic view illustrating a solid-liquid separating and dehydrating apparatus according to an embodiment of the present invention, for use in the solid-liquid separating and dehydrating step in a method of producing a wet master batch.

An example of the solid-liquid separating and dehydrating apparatus for wet master batch production of the present invention is described with reference to FIG. 1. The solid-liquid separating and dehydrating apparatus of FIG. 1 is an example provided merely for the purpose of illustrating an embodiment of the present invention, and the present invention is not limited thereto. The solid-liquid separating and dehydrating apparatus of FIG. 1 includes: a filter cloth 1 serving as a filtration filter; a drive roller 2 and a guide roller 3 for driving the filter cloth 1 in circles in a clockwise direction; a charge chute 4 for distributing a coagulum slurry on the filter cloth 1; a vacuum hopper 5 for subjecting the coagulum slurry to gravity filtration and vacuum filtration; a suction blower (connected to a gas-liquid separator 7 at a connection 6), which is not shown, for sucking air in the vacuum hopper to reduce the pressure; the gas-liquid separator 7 for separating air sucked by the suction blower from water separated by the gravity filtration and the vacuum filtration; a large-diameter drum 8 and one or a plurality of small-diameter pressure rolls 9 for pressure dehydrating the coagulum slurry after the gravity filtration and the vacuum filtration; and a cleaning device 10 for cleaning the filter cloth 1 after the pressure dehydration.

The filtration portion is formed of the vacuum hopper 5, the suction blower, which is not shown, and the gas-liquid separator 7, for example, in the solid-liquid separating and dehydrating apparatus of FIG. 1. The pressurizer corresponds to the pressure rolls 9, for example, in the solid-liquid separating and dehydrating apparatus of FIG. 1.

An example of the solid-liquid separating and dehydrating step is described with reference to FIG. 1. The coagulum slurry obtained through the mixing and coagulating step is supplied from a coagulation bath, which is not shown, to the charge chute 4. The coagulum slurry is distributed to a constant thickness from the charge chute 4 onto the filter cloth 1, which is filtered by the gravity when passing through above the vacuum hopper and, at the same time, subjected to vacuum filtering by the suction force of the vacuum hopper connected to the suction blower. The coagulum slurry that has been subjected to gravity filtration and vacuum filtration is then subjected to pressure dehydration when passing through between the drum 8 and the pressure rolls 9. When the coagulum slurry is obtained as a solid body having the desired moisture content as a result of the pressure dehydration, the solid separates from the filter cloth 1 so as to be discharged. The filter cloth 1 is run in a circulated manner and returns to the charge chute 4, during which the filter cloth 1 is cleaned by the cleaning device 10. When the filter cloth 1 returns to the position of the charge chute 4, the aforementioned series of operation is repeated. Water that has been removed as a result of the pressure dehydration and water that has been used for cleaning the filter cloth 1 may be recovered by a water-receiving hopper 11 or the like.

The cleaning device 10 is not particularly limited, and an example thereof may include, for example, a cleaning shower which sprays cleaning water through a shower nozzle so as to clean the filtration filter. The water for cleaning may be discarded after used once, or may be recovered as drainage by the gas-liquid separator 7 or by the water-receiving hopper 11 so as to be reused after being purified by a circulation and filtration apparatus or the like.

The gravity filtration refers to removing water by gravity from the coagulum slurry. To perform the vacuum filtration, a suction filtration device or the like, such as the vacuum hopper, may be provided on the underside of the filtration filter. The gravity filtration and the vacuum filtration can be simultaneously performed in the course of filtering, so as to enhance efficiency in removing water from the coagulum slurry.

The pressure dehydration can be performed by pressurizing, by means of the pressurizer, the coagulum slurry on the filtration filter from the filtration filter side relative to the outer peripheral surface of the large-diameter drum. The pressurizer is not particularly limited, and examples thereof may include, for example, pressure rolls, a pressure belt and the like. The pressure rolls, which are each denoted by reference numeral 9 in FIG. 1, are each formed of a metal roll covered with rubber or the like on the outer circumference thereof. The pressure belt, which is denoted by reference numeral 9' in FIG. 2, refers to a belt such as rubber which is wound in a tensioned manner around the outer peripheral surface of a plurality of rolls, and is run in a circulated manner by a motor or the like. The pressure belt is larger in area that contacts with the filtration filter, and thus, the pressure belt generally applies a pressure higher than that applied by the pressure rolls. Those exemplified as the pressurizer are disposed as being movable in a direction toward and away from the drum across the filtration filter disposed between the drum and the pressurizer, and the pressurizers are moved closer in the drum center axial direction so as to press the coagulum slurry on the filtration filter. There may be provided one or a plurality of the pressurizers as necessary. The pressurizer may preferably be formed of pressure rolls for the following reason. That is, in the case where a pressure belt is adopted as the pressure belt, there may arise a need to provide a meandering inhibitor in order to prevent a risk of meandering of the pressure belt from arising. In contrast thereto, in the case of the pressure rolls, no such meandering inhibitor needs to be provided.

The solid-liquid separating and dehydrating step may also be performed on separate filtration filters, but may preferably be performed on the single filtration filter for the following reason. That is, when the step is performed on the single filtration filter, the solid-liquid separating step and the dehydrating step, that have conventionally been performed in two stages using different apparatuses, can be performed as a continuous series of steps using a single apparatus.

Figure 2:
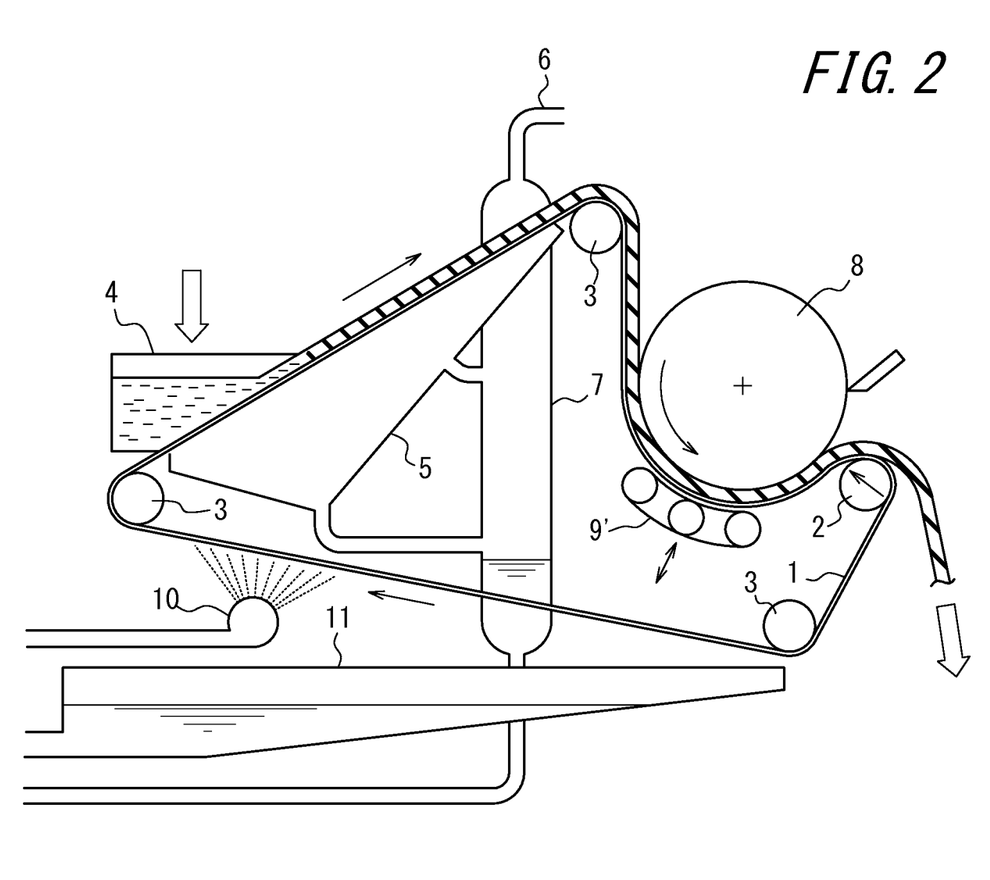
FIG. 2 is a schematic view illustrating a solid-liquid separating and dehydrating apparatus according to another embodiment of the present invention, for use in the solid-liquid separating and dehydrating step in a method of producing a wet master batch.

The filtration filter may preferably be of a belt-like filter cloth that runs in a circulated manner. Specifically, as illustrated in FIGS. 1 and 2, the filter cloth 1 is wound in a tensioned manner around the outer peripheral surface of a drive roller 2 connected to a motor and a plurality of guide rollers 3 supporting the filter cloth 1, and is run in a circulated manner through the driving of the drive roller 2. The reason for having the filtration filter formed of a belt-like filter cloth that is run in a circulated manner is that such configuration allows for downsizing of a device to be used in the solid-liquid separating and dehydrating step.

The filtration filter may have different properties depending on various conditions including air permeability, material, and others, and may be selected as appropriate through experiment by a person skilled in the art in consideration of various conditions such as the particle size of the coagulum in the coagulum slurry, the moisture content desired for a solid to be obtained after subjecting the slurry to the solid-liquid separating and dehydrating step, and other conditions, without being particularly limited. However, one preferred example may include a filtration filter having an air permeability of 10 $cm^3/(cm^2 \cdot s)$ to 200 $cm^3/(cm^2 \cdot s)$. The reason is that, with the air permeability of ≥10 $cm^3/(cm^2 \cdot s)$, no clogging occurs in the filtration filter, leading to high filtering efficiency, while with the air permeability of 200 $cm^3/(cm^2 \cdot s)$, the coagulum will not leak out through the filtration filter to be lost, which does not reduce the amount of a solid to be recovered after the dehydrating step. The air permeability of a filtration filter formed of a filter cloth was measured by an air permeability testing method (8.26) pursuant to "Testing method for woven and knitted fabrics" of JIS L1096 (2010). The air permeability may be set as appropriate by changing conditions such as the form of the thread, how the thread is woven, and the like.

Examples for the material making the filtration filter may include: polypropylene; polyester; nylon; and the like, with polypropylene or polyethylene terephthalate being preferred, and polyethylene terephthalate being most preferred. The reason is as follows. That is, polypropylene has a resistance to acid and alkali, and is capable of preventing the deterioration of the filtration filter resulting from the acid in the coagulum slurry. Polyethylene terephthalate has a resistance to acid, and, as well as being capable of preventing the deterioration of the filtration filter resulting from the acid of the coagulum slurry, polyethylene terephthalate is more excellent in cake peeling property as compared with polypropylene.

When the filtration filter is a filter cloth, the filter cloth may have different properties, depending on various conditions such as the form of the yarn, how the yarn is woven, and others, as well as the air permeability and the material thereof. The yarn may be in the form of, for example, monofilament, multifilament, staple, or the like, with monofilament or multifilament being preferred, and multifilament being most preferred for the following reasons. That is, monofilament is more excellent than others in terms of the following properties such as filtration capacity, cake peeling property, and clogging resistance. Multifilament is slightly inferior to monofilament in terms of filtration capacity, cake peeling property, and clogging resistance, whereas being excellent in collection ability of a coagulum slurry. Examples of the weave pattern may include: satin weave; twill weave; plain weave; and the like, with satin weave or twill weave being preferred, and satin weave being most preferred for the following reasons. That is, satin weave is more excellent than others in terms of filtration capacity, cake peeling property, and clogging resistance. Twill weave is slightly inferior to satin weave in terms of filtration capacity, cake peeling property, and clogging resistance, whereas being excellent in collection ability of a coagulum slurry.

The thickness of the filtration filter is not particularly limited, but may preferably be of 0.4 mm to 0.8 mm for the following reason. That is, the thickness of 0.4 mm or more allows for sufficient solid-liquid separation and dehydration, while the thickness of 0.8 mm or less is capable of enhancing efficiency in vacuum filtration.

The running speed of the filtration filter is not particularly limited, but may preferably be 0.5 m/min to 3.0 m/min for the following reason. That is, if the running speed is excessively fast, the solid-liquid separation and the dehydration become insufficient, which leads to a high moisture content in the solid obtained after the solid-liquid separating and dehydrating step, whereas if the running speed is excessively slow, the solid-liquid separation and the dehydration become excessive, which leads to a low moisture content in the solid obtained after the solid-liquid separating and dehydrating step, resulting in poor workability and handling ability in later stages.

The moisture content in a solid obtained after the solid-liquid separating and dehydrating step may be set as appropriate depending on the intended use, which is not particularly limited thereto but may preferably be set to 40 mass % to 65 mass %. The reason is that a solid having the moisture content falling within the aforementioned range can be handled with ease in the subsequent drying step, which may also suppress energy consumption.

The solid obtained after the solid-liquid separating and dehydrating step is not particularly limited, but may preferably be in a sheet shape or in a strip shape each having a thickness of 0.5 mm to 3.0 mm for the following reason. That is, the solid being in the aforementioned shape can be handled with ease in the subsequent drying step. The solid may be adjusted in thickness, by varying the amount and thickness of the coagulum slurry to be supplied to the filtration filter and also varying the gap width between the filtration filter and the pressurizer before supplying the coagulum slurry. The solid is in a sheet shape when having the moisture content of 40 mass % to 65 mass %.

[Drying Step/Molding Step]

The solid obtained in the aforementioned manner may be dried using a conventional dryer such as, for example, a vacuum dryer, an air dryer, a drum dryer, a hand dryer, a multi screw kneading extruder, or the like, so as to obtain a wet master batch. If necessary, the solid may be subjected to a molding step so as to be molded into a desired shape, before or after the drying step. Further, an additive such as an antioxidant or the like may also be added as needed. The wet master batch of the present invention obtained in the aforementioned manner can be used as a material of a rubber composition for producing various rubber products.

EXAMPLES

Hereinafter, the present invention is more specifically illustrated with reference to Examples and Comparative Examples. However, the scope of the present invention is not limited thereto.

[Preparation of Coagulum Slurry of Examples]

A natural rubber latex was mixed with a carbon black slurry containing a carbon black having a particle size at 50 volume % (D50) of 1 μm or less, which was coagulated in the presence of formic acid as a coagulant, to thereby obtain a coagulum slurry. The carbon black in the carbon black slurry was measured for the particle size at 50 volume % (D50) and a coagulum in the coagulum slurry was measured for the particle size at 90 volume % (D90) using Microtrac MT300 available from NIKKISO CO., LTD. To determine the coagulum concentration in the coagulum slurry, the coagulum slurry was subjected to evaporation to dryness at 130° C. so as to measure the dried mass as the coagulum content while measuring, as the moisture content, the mass difference before and after the drying, so as to calculate the ratio of the coagulum content to the moisture content, to thereby obtain the coagulum concentration in the slurry.

[Solid-Liquid Separation and Dehydration in Examples]

Using the solid-liquid separating and dehydrating apparatus shown in FIG. 1 which includes: pressure rolls serving as the pressurizer; and a filter cloth, the coagulum slurry was subjected to solid-liquid separation and dehydration under the conditions shown in Table 1. Here, the item "Supply Width of Coagulum Slurry" of the conditions shown in Table 1 refers to the width of the coagulum distributed on the filter cloth.

[Evaluation of Solid-Liquid Separation and Dehydration]

The solid obtained as a result of subjecting the coagulum slurry to the aforementioned solid-liquid separating and dehydrating step, and the solid-liquid separating and dehydrating step were evaluated as follows.

(1) Moisture Content in Solid

The moisture content in the solid obtained as a result of subjected to the solid-liquid separating and dehydrating step was measured using the heat drying type moisture analyzer MX-50 available from A&D COMPANY, LIMITED. The results are shown in Table 1 below.

(2) Recovery Percentage of Solid

The coagulum slurry was charged in a unit amount of input and subjected to solid-liquid separation and dehydration to obtain a solid. Based on the unit amount of input of the coagulum slurry and the concentration of the coagulum in the coagulum slurry, the total mass of the coagulum contained in the coagulum slurry in the unit amount of input was calculated. With respect to the calculated total mass of the coagulum, the rate of the mass of the obtained solid was calculated. The results are shown in Table 1 below.

(3) Flow Loss of Coagulum

The coagulum slurry in a unit amount of input was subjected to solid-liquid separation and dehydration, and part of the coagulum slurry that had passed through the meshes of the filter cloth to be lost was collected and measured for mass as a flow loss. Based on the flow loss of the coagulum slurry and the coagulum concentration in the lost coagulum slurry, the total mass of the coagulum contained in the lost coagulum slurry, that is, the mass of the lost coagulum was calculated. The total mass of coagulum contained in the coagulum slurry in a unit amount of input. With respect to the calculated total mass of coagulum, the rate of the mass of the lost coagulum was calculated. The results are shown in Table 1 below.

(4) Particle Size at 90 Volume % of Lost Coagulum

The coagulum collected in above (3) was measured for the particle size at 90 volume % (D90) of the lost coagulum that had passed through the meshes of the filter cloth, using Microtrac MT300 available from NIKKISO CO., LTD. The results are shown in Table 1 below.

[Solid-Liquid Separation and Dehydration of Comparative Example 1]

As Comparative Example 1, the coagulum slurry was subjected to solid-liquid separation and dehydration using a centrifugal separator (MJC-1000 available from TANAKA IRON WORKS CO., LTD.). However, the coagulum slurry leaked out from the screen to be lost, and could not be solid-liquid separated and dehydrated.

[Solid-Liquid Separation and Dehydration in Comparative Example 2]

As Comparative Example 2, the coagulum slurry was subjected to solid-liquid separation and dehydration using a screw press machine (2TR75 available from Moriyama Corporation) having a heating-type screw shaft. In this case as well, the coagulum slurry leaked out from the screen to be lost, and could not be esolid-liquid separated and dehydrated.

As shown in Table 1, the coagulum slurries of Examples were each successfully solid-liquid separated and dehydrated, so as to obtain a solid. However, in either of the case where a centrifugal separator was used in Comparative Example 1 and the case where a screw press machine was used in Comparative Example 2, the coagulum slurry leaked out from the screen, with the result that it was failed to separate water from the coagulum slurry through solid-liquid separation and dehydration.

As can be appreciated from the results of Examples above, the method of producing a wet master batch and the solid-liquid separating and dehydrating apparatus for wet master batch production of the present invention were capable of efficiently performing solid-liquid separation and dehydration even on a coagulum slurry containing a coagulum that is small in particle size.

REFERENCE SIGNS LIST 1 filter cloth
2 drive roller
3 guide roller
4 charge chute
5 vacuum hopper
6 connection between the suction blower and the gas-liquid separator
7 gas-liquid separator
8 drum

TABLE 1

|  |  | Examples | | | | | | | | | |
|---|---|---|---|---|---|---|---|---|---|---|---|
|  |  | 1 | 2 | 3 | 4 | 5 | 6 | 7 | 8 | 9 | 10 |
| Conditions | Coagulum Concentration in Coagulum Slurry (mass %) | 10 | 10 | 10 | 10 | 10 | 10 | 10 | 10 | 10 | 10 |
|  | D90 of Coagulum (μm) | 69 | 69 | 69 | 45 | 45 | 45 | 560 | 560 | 560 | 560 |
|  | Air Permeability of Filter Cloth (cm$^3$/(cm$^2$/sec)) | 183 | 183 | 183 | 183 | 42 | 9 | 183 | 11 | 15 | 12 |
|  | Material of Filter Cloth *1 | PP | PP | PP | PP | PP | PP | PP | PP | PP | E |
|  | Weave of Filter Cloth | satin | satin | satin | satin | twill | twill | satin | twill | satin | twill |
|  | Form of Yarn of Filter Cloth (Warp/Weft) *2 | M/M | M/M | M/M | M/M | M/M | F/F | M/M | M/M | M/S | F/F |
|  | Thickness of Filter Cloth (mm) | 0.5 | 0.5 | 0.5 | 0.5 | 1.25 | 1.06 | 0.5 | 0.53 | 0.75 | 0.45 |
|  | Supply Width of Coagulum Slurry (mm) | 270 | 270 | 270 | 100 | 100 | 100 | 270 | 270 | 270 | 270 |
|  | Running Speed of Filter Cloth (m/min) | 1.4 | 2.6 | 5.0 | 1.4 | 1.4 | 1.4 | 0.7 | 0.7 | 0.7 | 0.7 |
|  | Gap Width between Filter Cloth and Pressure Roll (mm) | 0 | 0 | 0 | 0 | 0 | 0 | 0 | 0 | 0 | 0 |
| Evaluation | Moisture Content in Solid (mass %) | 55 | 57 | 61 | 55 | 60 | 71 | 40 | 45 | 42 | 43 |
|  | Recovery Percentage of Solid (mass %) | 95 | 95 | 94 | 96 | 98 | 10 | 98 | 96 | 98 | 99 |
|  | Flow Loss of Coagulum (mass %) | 5 | 5 | 6 | 4 | 2 | 90 | 0.6 | 0.15 | 0.03 | ≤0.01 |
|  | D90 (μm) of Lost Coagulum | 60 | 60 | 60 | 50 | 50 | 45 | 72 | 55 | 38 | 38 |

*1 PP: polypropylene E: polyester ((polyethylene terephthalate), 'TR9A' manufactured by Nakao Filter Media Corp.) Ny: Nylon
*2 M: monofilament F: multifilament S: staple 9 pressure roll
9' pressure belt
10 cleaning device
11 water-receiving hopper

The invention claimed is:

1. A method of producing a wet master batch, comprising the step of:
solid-liquid separating and dehydrating a coagulum slurry obtained by mixing a rubber latex with a carbon black slurry containing a carbon black having an acid functional group of 0.2 µeq/m² to 3.0 µeq/m² dispersed in water and coagulating the mixture,
wherein, the coagulum slurry contains a coagulum having a particle size at 90 volume % (D90) of 40 µm to 1000 µm, the solid-liquid separating and dehydrating step comprises gravity filtering and vacuum filtering the coagulum slurry on a filter and then pressurizing, by means of a pressurizer, the coagulum slurry on the outer peripheral surface of a drum, to thereby pressure dehydrate the coagulum slurry.

2. The method of producing a wet master batch according to claim 1, wherein the filter is a belt-like filter cloth, the solid-liquid separating and dehydrating step is carried out on a single filter, and the filter runs in a circulated manner.

3. The method of producing a wet master batch according to claim 1, wherein a solid obtained through the solid-liquid separating and dehydrating step has a moisture content of 40 mass % to 65 mass %.

4. The method of producing a wet master batch according to claim 1, wherein a solid obtained through the solid-liquid separating and dehydrating step is in a sheet shape or in a strip shape each having a thickness of 0.5 mm to 3.0 mm.

5. The method of producing a wet master batch according to claim 1, wherein the filter has an air permeability of 10 cm³/(cm²·sec) to 200 cm³/(cm²·sec).

6. The method of producing a wet master batch according to claim 1, wherein the filter is made of a material being polypropylene or polyethylene terephthalate.

7. The method of producing a wet master batch according to claim 1, wherein the filter is woven in a twill weave or satin weave.

8. The method of producing a wet master batch according to claim 1, wherein the filter is woven by yarn in the form of monofilament or multifilament.

9. The method of producing a wet master batch according to claim 1, wherein the filter has a thickness of 0.4 mm to 0.8 mm.

10. The method of producing a wet master batch according to claim 2, wherein the filter runs at a running speed of 0.5 m/min to 3.0 m/min.

* * * * *